United States Patent [19]

Surjaatmadja et al.

[11] Patent Number: 4,917,349
[45] Date of Patent: Apr. 17, 1990

[54] VALVE, AND SET POINT PRESSURE CONTROLLER UTILIZING THE SAME

[75] Inventors: Jim B. Surjaatmadja; Mark C. Ehlert, both of Duncan, Okla.

[73] Assignee: Halliburton Company, Duncan, Okla.

[21] Appl. No.: 329,930

[22] Filed: Mar. 29, 1989

[51] Int. Cl.⁴ ........................................... F16K 31/122
[52] U.S. Cl. .................................... 251/63; 137/487.5
[58] Field of Search ............... 251/63; 137/487.5, 312, 137/270

[56] References Cited

U.S. PATENT DOCUMENTS

| | | | |
|---|---|---|---|
| 3,026,896 | 3/1962 | Bosworth | 251/63 X |
| 3,075,556 | 1/1963 | Hutter | 251/63 X |
| 4,052,997 | 10/1977 | Lorenzo | 137/312 |
| 4,550,747 | 11/1985 | Woodworth | 137/487.5 |

FOREIGN PATENT DOCUMENTS 1260099  3/1961  France ................... 251/63

Primary Examiner—Alan Cohan
Attorney, Agent, or Firm—James R. Duzan; E. Harrison Gilbert, III

[57] ABSTRACT

A set point pressure control circuit is disclosed for controlling pressure in a high pressure environment. The circuit includes a high pressure communicating, low pressure actuated valve. The valve includes a housing in which a valve member is disposed. The valve member has an axial passageway defined therethrough for communicating a high pressure port across a piston of the valve member to an opposite high pressure chamber which is placed in communication with a low pressure port when the valve member is in an open position.

8 Claims, 3 Drawing Sheets

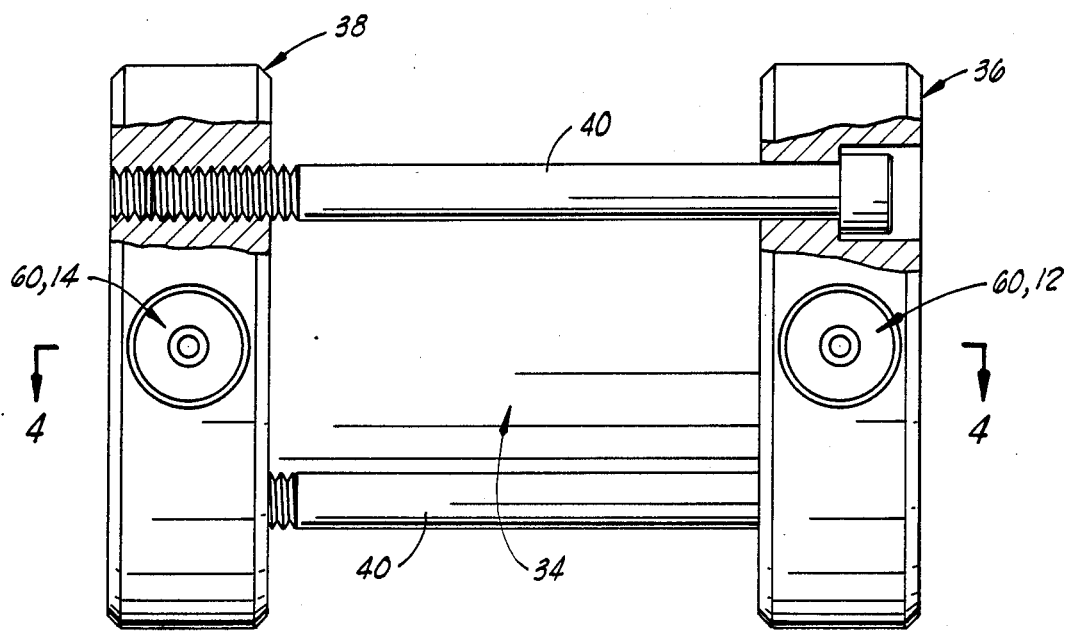
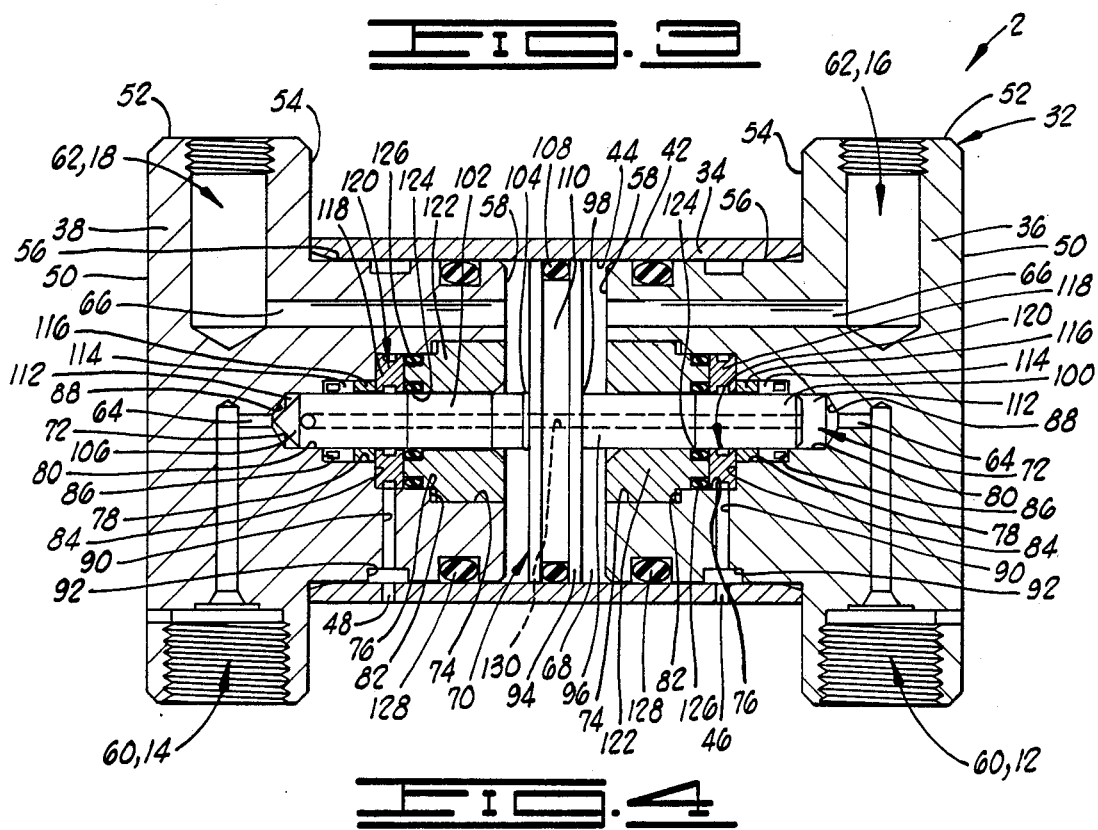

VALVE, AND SET POINT PRESSURE CONTROLLER UTILIZING THE SAME

BACKGROUND OF THE INVENTION

This invention relates generally to valves and more particularly, but not by way of limitation, to high pressure communicating, low pressure actuated valves. The present invention also relates to set point pressure controllers utilizing such valves, particularly set point controllers for relieving pressure from high pressure autoclaves.

In the oil and gas industry cement slurries are pumped into well bores for various reasons, one of which is for cementing casing. Different well bores can have different temperature and pressure conditions which can affect different cement slurries; therefore, it is desirable to be able to test a particular cement slurry for its suitability for a particular well bore environment. Such testing is well known in the industry.

A typical cement test occurs in a closed container to which heat can be applied to heat a sample of the cement to a desired temperature. The contents of the closed container are also maintained under pressure. The temperature and pressure are typically those anticipated to be encountered downhole. This type of testing device includes autoclaves. Specific examples of such test equipment are the Halliburton Services Cement Consistometer and the Halliburton Services Ultra-sonic Cement Analyzer (UCA).

In such high pressure devices, there has been a need for a pressure limiting mechanism to limit pressure increases such as result from temperature increases brought about by the heating which is typically performed at the beginning of a test. This pressure limiting has been done by a technician monitoring a pressure gauge and manually opening a valve to relieve pressure. A preferable way would be to use a valve which would automatically release a limited volume of pressurized fluid from the test container to produce a drop in pressure when the pressure reaches a predetermined level. This would require a controllable relief valve, but relief valves which are rated at 20,000 pounds per square inch (psi), which is a typical pressure rating on cement testing equipment of the type mentioned hereinabove, are not common, and those presently available typically relieve a much larger volume than is acceptable to maintain sufficient pressure to continue the desired cement test in the example of the Halliburton Services Cement Consistometer or the Halliburton Services Ultra-sonic Cement Analyzer.

One valve which has a suitable pressure rating is one available from Autoclave Engineers. In a test using this valve, it was determined that the valve reaction time was not acceptable and that too much pressure was relieved from the small cement testing container such as is used in the aforementioned Cement Consistometer and Ultra-sonic Cement Analyzer. We also believe that the large mass of the piston and inherent friction of the packing seal of the Autoclave Engineer valve would be detrimental to the accurate control needed with the particular type of cement testing equipment referred to hereinabove.

For achieving accurate high pressure control of high pressure testing containers, such as consistometers and the like, a valve is needed which can respond quickly, release small volumes of pressurized fluid, and be used with high pressure fluids. To facilitate control, it would also be desirable for such a valve to have a small size and to respond to low pressure actuation. It would also be desirable for such a valve to be controllable by a computer. There is also the need for a set point pressure controller which includes and adapts such a valve for controlling pressure in a high pressure environment.

SUMMARY OF THE INVENTION

The present invention overcomes the above-noted and other shortcomings of the prior art and meets the aforementioned needs by providing a novel and improved valve and set point pressure controller which includes such a novel and improved valve. An advantage of the valve of the present invention is that it has a fast response time. It can also transfer small volumes of high pressure fluid so that small pressure changes can be obtained. The valve of the present invention is small but it can control fluids under high pressure, such as 20,000 psi. Despite being able to control such high pressure fluids, the valve of the present invention can be actuated by a low pressure fluid, such as air at 50 psi. Such low pressure actuation enables the valve to be used in a computer control system. These advantages also apply to a set point pressure controller which includes such a valve whereby the set point pressure controller is simplified.

A valve of the present invention comprises: a housing having a high pressure port and a low pressure port defined therein; a valve member disposed in the housing so that the valve member is movable between a closed position, wherein the high pressure port does not communicate with the low pressure port, and an open position, herein the high pressure port communicates with the low pressure port; seal means for providing a seal between the valve member and the housing; and communicating means, disposed in the valve member, for continuously communicating the high pressure port across the seal means regardless of the position of the valve member. In a preferred embodiment, the communicating means includes a passageway defined axially through the valve member. In a preferred embodiment, in the closed position the valve member has an end which is engaged with the housing at the low pressure port to block communication between the low pressure port and the high pressure port so that the high pressure acts on the valve member to provide a failsafe against the valve member inadvertently opening.

In a preferred embodiment, the housing further has defined therein: a central cavity; an axial cavity extending from the central cavity and communicating with the high pressure port; and a high pressure leakage passage extending from the axial cavity to the exterior of the housing.

In a preferred embodiment, the housing includes a sleeve, a first end piece having the high pressure port defined therein, and a second end piece having the low pressure port defined therein; and the first end piece and the second end piece are disposed in opposite ends of the sleeve for permitting either of the end pieces to be rotated relative to the sleeve so that the high pressure and low pressure ports are positionable at different angles to each other.

The present invention also provides a set point pressure controller which includes the novel and improved valve of the present invention. The set point pressure controller comprises: set point means for sensing when pressure in a high pressure environment is at least a predetermined magnitude; air supply means for supplying air at low pressure; a valve having a high pressure port for communicating with the high pressure environment, and the valve further having a low pressure port selectably communicable with the high pressure port, and the valve including means for communicating with the air supply means; and control means, responsive to the set point means, for switchably communicating the air supply means with the valve for controlling the communication of the low pressure port with the high pressure port to relieve pressure in the high pressure environment when pressure therein is at least the predetermined magnitude. The valve includes a housing having the high pressure port and the low pressure port defined therein and further having a valve member receptacle defined therein, the valve member receptacle communicating with the low pressure port and the high pressure port; a two-ended valve member disposed in the valve member receptacle so that one end is near where the high pressure port communicates with the valve member receptacle and the other end is near where the low pressure port communicates with the valve member receptacle; first high pressure seal means for sealing between the one end of the valve member and the housing so that a first high pressure chamber is defined in the valve member receptacle where the valve member receptacle communicates with the high pressure port; second high pressure seal means for sealing between the other end of the valve member and the housing so that a second high pressure chamber is defined in the valve member receptacle where the valve member receptacle communicates with the low pressure port; and communicating means, defined through the valve member, for continuously communicating the first and second high pressure chambers.

Therefore, from the foregoing, it is a general object of the present invention to provide a novel and improved valve and a novel and improved set point pressure controller utilizing such a valve. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 3 is a partially cut-away, elevational vie of the preferred embodiment of the present invention.

FIG. 4 is a sectional view of the valve taken along line 4—4 shown in FIG. 3.

FIG. 5 is an end view of the valve shown in FIG. 3, but showing a different orientation of ports in dashed lines.

DETAILED DESCRIPTION OF PREFERRED EMBODIMENTS

Figure 1:
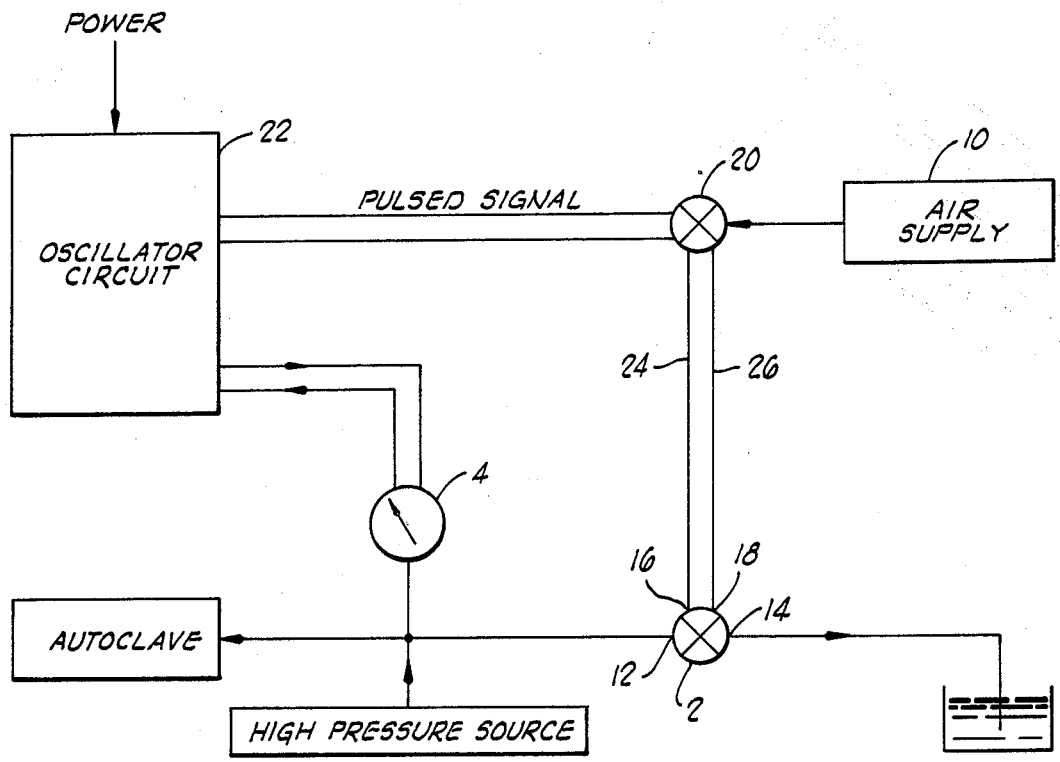
FIG. 1 is a functional block diagram of a set point pressure controller.

FIG. 1 shows a set point pressure controller circuit which includes a valve 2 of the present invention. The preferred embodiment of the valve 2 will be described with reference to FIGS. 3–5 after the set point pressure controller is described with reference to FIGS. 1 and 2.

Set Point Pressure Controller

The set point pressure controller is shown in FIG. 1 with an autoclave which is pressurized by a high pressure source. Specific examples of equipment with which the set point pressure controller can be used are the Halliburton Services Cement Consistometer and the Halliburton Services Ultra-sonic Cement Analyzer (UCA). A high pressure chamber of this equipment can be pressurized by any suitable high pressure source, such as a Sprague or Haskel air over water intensifier pump. In a specific application, such a pump might pressurize the high pressure chamber to a pressure of 20,000 psi, for example (as generally used herein "high pressure" and "low pressure" are relative terms with "high pressure" being some magnitude greater than "low pressure").

The set point pressure controller shown in FIG. 1 comprises set point means for sensing when the pressure in the high pressure environment being controlled (such as the autoclave in our illustrated example) is at least a predetermined magnitude. This is implemented in the preferred embodiment by a pressure gauge 4 having electrical contacts 6, 8 (see FIG. 2) which close when the pressure gauge 4 detects that the monitored pressure has reached an alarm limit entered into the pressure gauge in a known manner. Other suitable devices for sensing pressure and indicating when a predetermined pressure level has been reached can be used.

The set point pressure controller shown in FIG. 1 also comprises air supply means 10 for supplying air at low pressure. In the preferred embodiment, it is contemplated that the low pressure air is less than 200 psi, which is less than 1%.of the high pressure of 20,000 psi stated above in our example. It is contemplated that the air supply means can be any suitable known source of low pressure air. A conventional air compressor or other source of "shop air" such as might be provided at 50 psi can be used in particular applications.

The set point pressure controller still further comprises the valve 2. The valve 2 has a high pressure port 12 connected to the high pressure environment, and it has a low pressure port 14 connected to a low pressure drain which is at some pressure below the high pressure environment. For example, the port 14 might be at atmospheric pressure. The valve 2 also includes actuating fluid ports 16, 18 which communicate with the air supply 10.

Communication between the ports 16, 18 and the air supply 10 is made through a solenoid valve 20 which is operated by an oscillator circuit 22. The elements 20, 22 define a control means for switchably communicating the air supply 10 with the valve 2 for controlling the communication of the low pressure port 14 with the high pressure port 12. The low pressure port 14 communicates with the high pressure port 12 to relieve pressure from the high pressure environment when pressure in the high pressure environment is at least the predetermined magnitude sensed by the pressure gauge 4 to which the control means is responsive.

The solenoid valve 20 is a conventional device for communicating the low pressure air from the air supply 10 to either of two air lines 24, 26 connected to the ports 16, 18, respectively. Which air line 24, 26 is selected is determined by the operation of the oscillator circuit 22.

Figure 2:
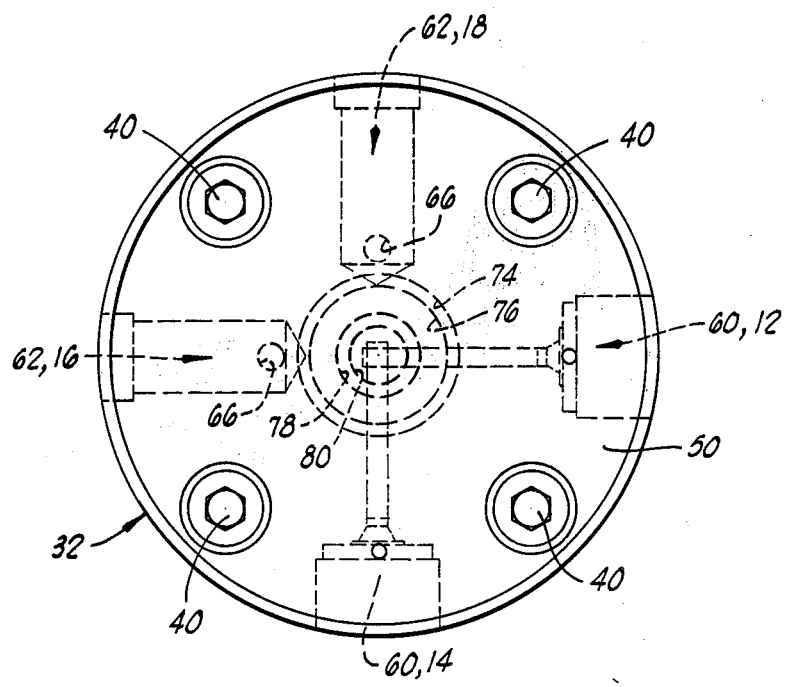
FIG. 2 is a schematic circuit diagram of a specific embodiment of the oscillator circuit shown in FIG. 1.
Figure 2:
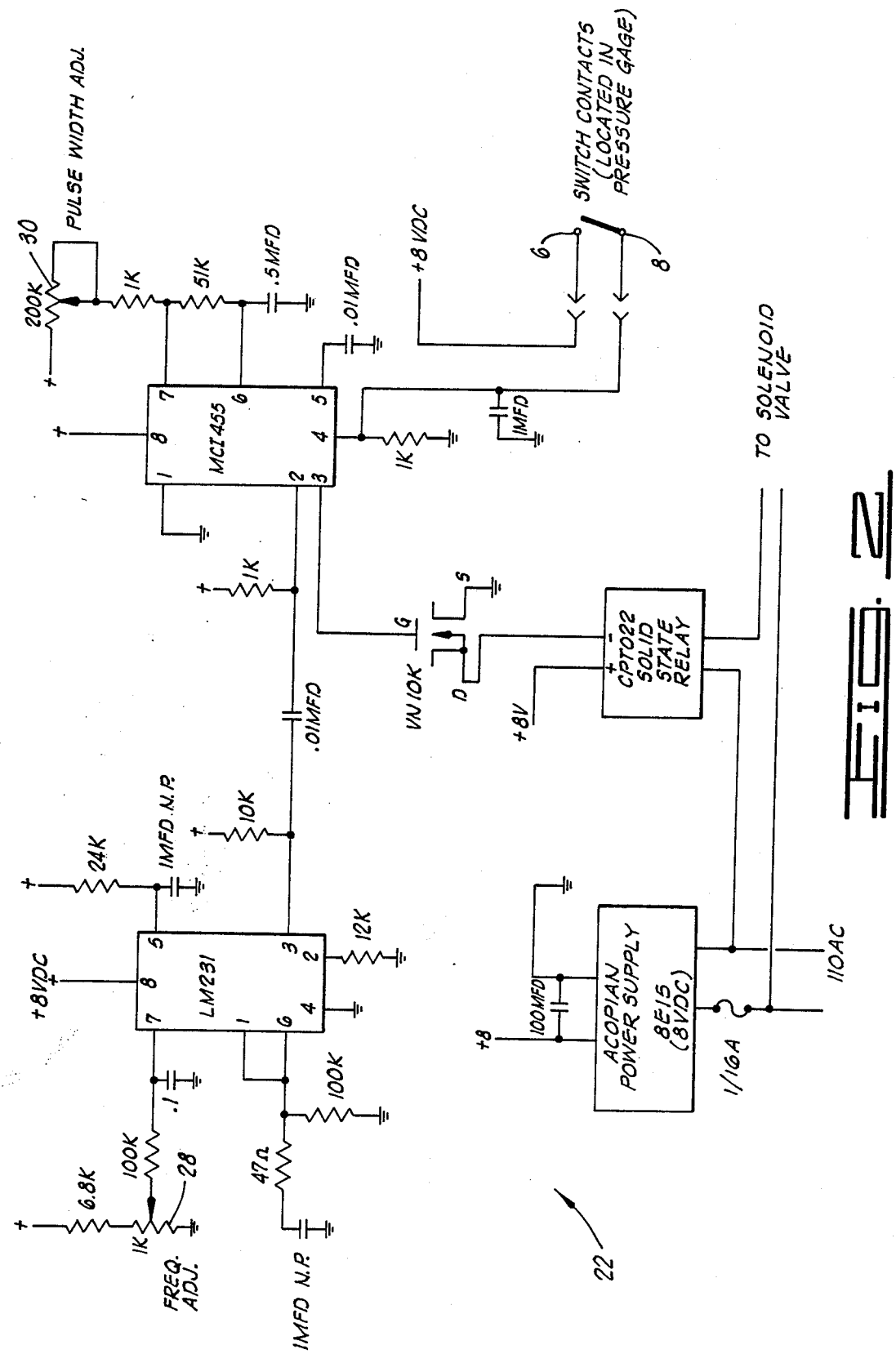

A specific implementation of the oscillator circuit 22 is shown in FIG. 2 which is self-explanatory. Briefly, however, when the switch contacts 6, 8 of the gauge 4 close, the oscillator circuit 22 generates pulses which are transmitted to the solenoid valve 20 to operate it for interfacing the air supply 10 with the valve 2. The pulses operate the solenoid valve 20 so that the valve 2 opens and closes quickly enough to obtain a pressure drop of under 200 psi for a Halliburton Services Ultrasonic Cement Analyzer autoclave full of water. If the pressure does not drop sufficiently to open the gauge 4 contacts 6, 8, the oscillator circuit 22 continues pulsing the solenoid valve 20. As indicated by variable resistors 28, 30 shown in FIG. 2, the circuit 22 has adjustable frequency and pulse width so that it can be tuned to different autoclave volumes.

It is contemplated that other embodiments of a control means can be used. For example, with a programmable controller, pressure transducer and electronic air regulator, it should be possible to perform pressure control ramps.

For a system such as that shown in FIG. 1, a rupture disk (not shown) should be used in a known manner to limit pressures to the working pressure of the autoclave because the valve 2, in its preferred embodiment described hereinbelow, will not operate if either air pressure or power to the electronics is interrupted.

Valve 2

The valve 2 of the preferred embodiment is a high pressure communicating, low pressure actuated valve. The preferred embodiment is depicted in FIGS. 3-5.

The valve 2 shown in FIGS. 3-5 includes a housing 32. The housing 32 includes a sleeve 34. It also includes an end piece 36 disposed in one end of the sleeve 34, and it also includes an end piece 38 disposed in the other end of the sleeve 34. These three pieces are held together by four screws 40 (FIGS. 3, 5).

The sleeve 34 is cylindrical, having a cylindrical outer surface 42 and a cylindrical inner surface 44. Communicating between these surfaces are two cylindrical relief ports 46, 48.

The two end pieces 36, 38 are structurally identical so that only the end piece 36 will be specifically referred to, but like reference numerals are used in the drawings to identify corresponding features of the end piece 38. Functionally, the end piece 36 is designated in the preferred embodiment as the high pressure end piece and the end piece 38 is designated as the low pressure end piece as will become more apparent hereinbelow.

The end piece 36 is an integral cylindrical member having a circular end surface 50 from which a cylindrical outer surface 52 extends to a radially extending annular surface 54. A cylindrical surface 56 extends from the annular surface 54 to an annular end surface 58.

Defined diametrically opposite each other through the cylindrical surface 52 are two ports 60, 62, one of which is designated in FIG. 4 as the high pressure port 12, and the other of which is designated in FIG. 4 as the actuating fluid port 16. The port 60, 12 is adapted to connect to the high pressure environment, and the port 62, 16 is adapted to connect to the fluid supply by which the valve 2 is operated. In the environment shown in FIG. 1, this operating or actuating fluid supply is the air supply 10. The port 60 extends radially into the body of the end piece 36 to an axial passage 64 defined in the end piece 36. The port 62 extends radially into the body of the end piece 36 to a longitudinal passage 66 defined therein. The passage 66 communicates the port 62 with a central cavity or chamber 68 defined between the axially spaced end surfaces 58 of the end pieces 36, 38 as shown in FIG. 4. This communicates the control or actuating fluid to one side of a valve member 70 of the valve 2, which valve member 70 will be further described hereinbelow.

The passage 64 of the port 60 communicates with an axial cavity 72 extending between the passage 64 and the central cavity 68. The axial cavity 72 communicates through the end surface 58 at its center, thereby giving the surface 58 its annular form. The axial cavity 72 is defined by a series of counterbores by which cylindrical surfaces 74, 76, 78, 80 are radially inwardly offset from each other by radial surfaces 82, 84, 86, respectively. A tapered or frusto-conical surface 88 of the cavity 72 extends between the surface 80 and the cylindrical surface defining the passage 64. The surface 88 is the surface through which the port 60 communicates with the cavity 72.

The end piece 36 also includes a leakage channel defined by a radial passage 90 intersecting the surface 76 and extending radially outwardly to its intersection with a circumferential groove 92 forming another part of the leakage channel. This leakage channel communicates with the relief port 46 of the sleeve 36. The leakage channel and relief port define a high pressure leakage passage extending from the axial cavity 72 to the exterior of the housing 32.

As previously mentioned, the structural features of the end piece 38 are the same as those of the end piece 36 except that the corresponding port 60 of the end piece 38 is used as the low pressure port 14, and the corresponding port 62 of the end piece 38 is used as the other actuating fluid port 18.

In the preferred embodiment the two end pieces 36, 38 are disposed in opposite ends of the sleeve 34 so that the two end pieces can be rotated relative to the sleeve 34 and to each other so that the ports 60, 62 of the end piece 36 can be positioned at a selected angular relationship to the corresponding ports 60, 62 of the end piece 38. One such different angular positioning is illustrated in FIG. 5 wherein the ports of one end piece are on a line perpendicular to the line of the two ports of the other end piece. As illustrated in FIGS. 3 and 4, the ports of one end piece are on a line parallel to the line of the ports of the other end piece. This allows for the reorientation of the ports to facilitate connections which have to be made to them.

The end pieces 36, 38 are also retained within the sleeve 34 so that the respective axial cavities 72 are axially aligned and define extensions from the central cavity 68. The central cavity 68 and the two oppositely extending cavities 72 form a valve member receptacle for receiving the valve member 70 of the valve 2. The valve member 70 includes a circular piston 94 which is slidably disposed in the cylindrical central cavity 68. Extending axially from one side of the piston 94 is a cylindrical first stem 96. The stem 96 extends from a base 98 to a free end 100 which is disposed i the cavity 72 of the end piece 36.

Extending from the opposite side of the piston 94 is a stem 102. It has a base portion 104 and a free end portion 106. The free end 106 is disposed in the cavity 72 of the end piece 38. The stem 102 is generally cylindrical, but it terminates at its free end 106 in a conical shape.

The valve member 70 is disposed in the valve member receptacle so that the free end 100 of the stem 96 is near where the high pressure port 12 communicates with the valve member receptacle through the passage 64 of the end piece 36. It is also disposed so that the free end 106 of the stem 102 is near where the low pressure port 14 communicates with the valve member receptacle through the passage 64 of the end piece 38.

The valve 2 also includes a number of seal means. One seal means provides a seal between the piston 94 of the valve member 70 and the surface 44 of the sleeve 34 of the housing 32. In the preferred embodiment this is a conventional 0-ring 108 providing a low pressure seal across the piston 94. The 0-ring 108 is carried in a circumferential groove 110 of the piston 94.

There are two high pressure seal means, one in each of the end pieces 36, 38. Each of these provides a seal between the respective adjacent stem of the valve member 70 and the respective end piece so that a high pressure chamber 112 is defined in the axial cavity of the respective end piece and receives the free end of the respective stem. As shown in FIG. 4, each high pressure seal means of the preferred embodiment includes a cylindrical high pressure seal 114 and seal backup ring 116 disposed in the counterbore defined by the surfaces 78, 86. The inner surface of the high pressure seal 114 seals against the free end of the respective stem as the stem moves axially therethrough. Each high pressure seal means also includes a seal spacer 118 disposed in the adjacent counterbore next to the seal backup ring 116. As is apparent from FIG. 4, each high pressure chamber 112 communicates with the port 60 of the respective end piece.

Disposed next to the seal spacer 118 in each of the end pieces 36, 38 is a leakage chamber seal means for sealing between the adjacent stem of the valve member 70 and the adjacent end piece so that a leakage chamber 120 is defined in the axial cavity of the respective end piece. This leakage chamber 120 is defined adjacent the high pressure seal means and in communication with the leakage channel communicating with the respective relief port 46, 48 so that should the high pressure seal fail, thereby creating a high pressure leak, the high pressure will be vented through the leakage chamber 120 and the leakage passage extending to the exterior of the housing 32. In the preferred embodiment each leakage chamber seal means includes a seal retainer 122 disposed in the counterbore defined by the surfaces 74, 82 and extending into the adjacent counterbore. Each such seal means also includes two 0-rings 124, 126 carried on the end of the seal retainer 122 adjacent the seal spacer 118. The 0-ring 124 is disposed radially inwardly of the seal 126. Thus, the seal 124 seals against the respective stem of the valve member 70, and the 0-ring 126 seals against the surface 76 of the respective end piece.

Associated with each end piece 36, 38 is a further seal means. This seal means provides a seal between the respective cylindrical member of the end piece and the sleeve 34 intermediate the leakage channel and end surface 58 of the respective cylindrical member. In the preferred embodiment, each of the seal means includes an 0-ring 128.

The valve 2 further comprises communicating means for continuously communicating the high pressure port 12 across the piston 94, sealed by the 0-ring 108, regardless of the position of the valve member 70 within the valve member receptacle. This communicating means is disposed in the valve member 70 in the preferred embodiment, and is specifically a passageway 130 defined axially through the piston 94 and the stems 96, 102. As shown in FIG. 4, the passageway 130 opens axially through the free end 100 of the stem 96 and extends to the free end 106 of the stem 102 where it intersects a radial opening extending to the exterior of the stem 102. Thus, the opening at the free end 100 communicates with the high pressure chamber 112 of the end piece 36, and the opening in the free end 106 of the stem 102 communicates with the high pressure chamber 112 of the end piece 38. This creates a pressure balance across the piston 70. This leads to structural and operational advantages of the present invention.

These advantages include that a relatively small operating pressure can be used to move the valve member 70 between an open position and a closed position. In the open position, which is illustrated in FIG. 4, the conical free end 106 is disengaged from the tapered surface 88 and passage 64 of the end piece 38 so that the high pressure port 12 communicates with the low pressure port 14 through the communicating means passage 130. More specifically, in the open position the low pressure port 14 is allowed to communicate with the high pressure chamber 112 of the end piece 38, which chamber 112 is always communicating with the chamber 112 of the end piece 36 and the high pressure port 12 thereof through the passageway 130. In this position there is a pressure balance across the valve member 70.

To move the valve member 70 to a closed position, sufficient air pressure (which can be low due to the pressure balancing) from the air supply 10 for the environment shown in FIG. 1 is communicated through the port 62 of the end piece 36. This pushes the valve member 70 to the left until the conical surface of the free end 106 of the stem 102 engages the tapered surface 88 and the passage 64 of the end piece 38 to block communication between the low pressure port 14 and the high pressure chamber 112 of the end piece 38. This prevents communication between the high pressure port 12 and the low pressure port 14. Pressure balance across the piston 94 of the valve member 70 is maintained, however, because the high pressure within the high pressure chamber 112 of the end piece 36 is also present in the high pressure chamber 112 of the end piece 38 by means of the communicating means passageway 130. Thus, to reopen the valve member 70, still only a small actuating pressure is needed. This will be provided through the port 62 of the end piece 38 to move the valve member 70 back to an open position such as that shown in FIG. 4. In view of the foregoing operation, the maximum actuating pressure needed to open the valve member 70 is the difference between the high pressure at the port 12 and the low pressure at the port 14 multiplied by the cross-sectional area of the port 64 of the end piece 38 where the free end 106 of the stem 102 seals in the closed position. Because this sealing area is small, the actuating pressure is small even though the pressure differential between the high pressure and low pressure ports might be great. For example, if the high pressure port were at 20,000 psi (gauge) and the low pressure port were at atmospheric pressure [0 psi (gauge)] and if the passage 64 has a diameter of 1/16-inch, an operating pressure of only about 62 psi (gauge) would be needed to open the valve member 70.

Advantages of this include that small operating pressures can be used or even an electrical excitation means can be used to operate the valve. This permits use with a computer to control the valve 2. The valve can be small in size to permit rapid response (e.g., 10--15 millisecond response) and to prevent the loss of too much pressure when the valve is opened (i.e., small size translates to small volumes of pressurized fluid being released if the valve is opened for only a short time, which means finer pressure control can be achieved). Conventional high pressure valves would likely be three to four times larger than a valve constructed in accordance with the preferred embodiment shown in FIG. 4 for use in a 20,000 psi environment, which larger size would result in slower operating times and larger pressure volumes conducted. For the preferred embodiment shown in FIG. 4 wherein the high pressure port 12 is designated in the end opposite the stem 102 which seals the port 14 from its high pressure chamber 112, another advantage is that this use of the high pressure port keeps the valve member 70 closed should the actuating pressure be lost. Thus, this acts as a failsafe. It also prevents or reduces cavitation in the seal area between the conical free end 106 of the stem 102 and the surface 88 of the end piece 38. That is, cavitation of these sealing surfaces would more likely occur if the high pressure acted against the end 106 through the passage 64 of the end piece 38. Such cavitation could degrade the sealing surfaces sufficiently to prevent adequate sealing. In the preferred embodiment, however, this cavitation is prevented when the valve member 70 is in its closed position by having the cavity 72, rather than the passage 64, of the end piece 38 have the high pressure when the valve member 70 is closed.

Thus, the present invention is well adapted to carry out the objects and attain the ends and advantages mentioned above as well as those inherent therein. While preferred embodiments of the invention have been described for the purpose of this disclosure, changes in the construction and arrangement of parts can be made by those skilled in the art, which changes are encompassed within the spirit of this invention as defined by the appended claims.

What is claimed is:
1. A valve comprising:
 a housing having a high pressure port and a low pressure port defined therein, said housing including:
  a sleeve;
  a first end piece having said high pressure port defined therein; and
  a second end piece having said low pressure port defined therein; and
  wherein said first end piece and said second end piece are disposed in opposite ends of said sleeve for permitting either of said end pieces to be rotated relative to said sleeve so that said high pressure and low pressure ports are positionable at different angles to each other;
 a valve member disposed in said housing so that said valve member is movable between a closed position, wherein said high pressure port does not communicate with said low pressure port, and an open position, wherein said high pressure port communicates with said low pressure port;
 seal means for providing a seal between said valve member and said housing; and
 communicating means, disposed in said valve member, for continuously communicating said high pressure port across said seal means regardless of the position of said valve member.

2. A valve as defined in claim 1, wherein: said housing includes a sealing surface at said low pressure port; and said valve member includes a sealing surface for engaging said sealing surface of said housing at said low pressure port when said valve member is in said closed position so that high pressure does not cause cavitation of said sealing surfaces when said valve member is in said closed position.

3. A high pressure communicating, low pressure actuated valve, comprising:
 a cylindrical sleeve having a first end and a second end;
 a first cylindrical member disposed in said first end of said sleeve, said first cylindrical member including an end surface and said first cylindrical member having defined therein:
  an actuating air port communicating through said end surface of said first cylindrical member;
  an axial cavity communicating through said end surface of said first cylindrical member; and
  a high pressure port communicating with said axial cavity of said first cylindrical member;
 a second cylindrical member including an end surface and disposed in said second end of said sleeve so that said end surface of said second cylindrical member is spaced axially from said end surface of said first cylindrical member to define a chamber therebetween, said second cylindrical member having defined therein: an actuating air port communicating through said end surface of said second cylindrical member;
  an axial cavity communicating through said end surface of said second cylindrical member; and
  a low pressure port communicating with said axial cavity of said second cylindrical member;
 a valve member, including:
  a piston, slidably disposed in said chamber;
  a first stem, extending from a base end at one side of said piston to a free end disposed in said cavity of said first cylindrical member; and
  a second stem, extending from a base end at the other side of said piston to a free end disposed in said cavity of said second cylindrical member;
 first high pressure seal means, disposed in said cavity of said first cylindrical member, for sealing between said first stem and said first cylindrical member so that a high pressure chamber is defined in said cavity of said first cylindrical member and receives said free end of said first stem;
 second high pressure seal means, disposed in said cavity of said second cylindrical member, for sealing between said second stem and said second cylindrical member so that a high pressure chamber is defined in said cavity of said second cylindrical member and receives said free end of said second stem; and
 communicating means for communicating pressure across said piston from said high pressure chamber of said cavity of said first cylindrical member to said high pressure chamber of said cavity of said second cylindrical member, said communicating means including a passageway defined through said first and second stems and said piston between said free end of said first stem and said free end of said second stem.

4. A valve as defined in claim 4, wherein said first and second cylindrical members are rotatably disposed in said cylindrical sleeve so that said first and second cylindrical members are rotatable relative to each other for positioning said actuating air port and said high pressure port of said first cylindrical member at a selected angular relationship to said actuating air port and said low pressure port of said second cylindrical member.

5. A valve as defined in claim 3, wherein:
said sleeve has a first relief port and a second relief port defined therein;
said valve further comprises:
first leakage chamber seal means, disposed in said cavity of said first cylindrical member intermediate said first high pressure seal means and said end surface of said first cylindrical member, for sealing between said first stem and said first cylindrical member so that a leakage chamber is defined in said cavity of said first cylindrical member; and
second leakage chamber seal means, disposed in said cavity of said second cylindrical member intermediate said second high pressure seal means and said end surface of said second cylindrical member, for sealing between said second stem and said second cylindrical member so that a leakage chamber is defined in said cavity of said second cylindrical member;
said first cylindrical member further has defined therein a leakage channel communicating said leakage chamber of said cavity of said first cylindrical member with said first relief port; and
said second cylindrical member further has defined therein a leakage channel communicating said leakage chamber of said cavity of said second cylindrical member with said second relief port.

6. A valve as defined in claim 5, wherein said first and second cylindrical members are rotatably disposed in said cylindrical sleeve so that said first and second cylindrical members are rotatable relative to each other for positioning said actuating air port and said high pressure port of said first cylindrical member at a selected angular relationship to said actuating air port and said low pressure port of said second cylindrical member.

7. A valve as defined in claim 6, further comprising:
seal means for providing a seal between said first cylindrical member and said sleeve intermediate said leakage channel and said end surface of said first cylindrical member; and
seal means for providing a seal between said second cylindrical member and said sleeve intermediate said leakage channel and said end surface of said second cylindrical member.

8. A valve as defined in claim 3, wherein:
said axial cavity of said second cylindrical member includes a sealing surface through which said low pressure port communicates with said axial cavity of said second cylindrical member; and
said free end of said second stem includes a sealing surface engaging said sealing surface of said axial cavity of said second cylindrical member so that high pressure cavitation of said sealing surfaces does not occur when said valve member is in a closed position.

* * * * *